US012801115B2

(12) United States Patent
Lee et al.

(10) Patent No.: US 12,801,115 B2
(45) Date of Patent: Nov. 17, 2026

(54) ACTIVE VIBRATION REDUCTION DEVICE AND METHOD OF MACHINE TOOL

(71) Applicant: DN SOLUTIONS CO., LTD., Changwon (KR)

(72) Inventors: Changho Lee, Changwon (KR); Kwangseop Sim, Changwon (KR); Ok Hyun Jo, Changwon (KR)

(73) Assignee: DN SOLUTIONS CO., LTD., Changwon (KR)

( * ) Notice: Subject to any disclaimer, the term of this patent is extended or adjusted under 35 U.S.C. 154(b) by 290 days.

(21) Appl. No.: 18/711,888

(22) PCT Filed: Sep. 23, 2022

(86) PCT No.: PCT/KR2022/014301
§ 371 (c)(1),
(2) Date: May 21, 2024

(87) PCT Pub. No.: WO2023/096128
PCT Pub. Date: Jun. 1, 2023

(65) Prior Publication Data

US 2025/0028297 A1 Jan. 23, 2025

(30) Foreign Application Priority Data

Nov. 24, 2021 (KR) ........................ 10-2021-0162847

(51) Int. Cl.
*G05B 19/404* (2006.01)

(52) U.S. Cl.
CPC .. *G05B 19/404* (2013.01); *G05B 2219/39241* (2013.01)

(58) Field of Classification Search
CPC ........ G05B 19/404; G05B 2219/39241; G05B 2219/37432; G05B 2219/41115; G05B 2219/37434; G05B 2219/41128; G05B 2219/42077; G05B 2219/49048; G05B 2219/49054; F16F 15/005; F16F 15/03; F16F 15/002; B23Q 17/12; B23Q 15/12; B23Q 11/0039; B23Q 11/0032; B23Q 17/0971; B06B 1/045; G05D 19/02
See application file for complete search history.

(56) References Cited

U.S. PATENT DOCUMENTS

2001/0033146 A1* 10/2001 Kato ........................ G05B 5/01
318/568.22
2015/0217379 A1* 8/2015 Kim ........................ G05B 15/02
82/158
2020/0156207 A1* 5/2020 Astarloa Badiola ... B23Q 15/12
2020/0233396 A1* 7/2020 Kurokami ............ B23Q 17/098
2022/0134501 A1* 5/2022 Ahn ........................ F16F 15/04
409/141

FOREIGN PATENT DOCUMENTS

WO WO-2021135174 A1 * 7/2021 .............. F16F 15/06

* cited by examiner

*Primary Examiner* — Christopher E. Everett
(74) *Attorney, Agent, or Firm* — Harvest IP Law, LLP

(57) ABSTRACT

The present disclosure relates to an active vibration reduction device and method of a machine tool, and more specifically, to an active vibration reduction device and method of a machine tool wherein vibration generated from an individual unit is automatically and actively reduced in real time by changing and generating excitation opposite to vibration data of the individual device in real time in an excitation unit.

9 Claims, 14 Drawing Sheets

ACTIVE VIBRATION REDUCTION DEVICE AND METHOD OF MACHINE TOOL

CROSS REFERENCE TO RELATED APPLICATION(S)

This application is a National Stage of International Application No. PCT/KR2022/014301 filed on Sep. 23, 2022, claiming priority based on Korean Patent Application No. 10-2021-0162847 filed on Nov. 24, 2021 the disclosure of which is incorporated herein by reference in their entirety.

FIELD OF THE DISCLOSURE

The present disclosure relates to an active vibration reduction device and method of a machine tool, and more specifically, to an active vibration reduction device and method of a machine tool wherein vibration generated from an individual device is automatically and actively reduced in real time by changing and generating excitation opposite to vibration data of the individual device in real time in an excitation unit.

BACKGROUND OF THE DISCLOSURE

In general, a machine tool refers to a machine used to process metal/non-metal workpieces in a desired shape and dimension using a suitable tool by using various types of cutting or non-cutting methods.

Various types of machine tools including a turning center, a vertical/horizontal machining center, a door-type machining center, a Swiss turning machine, an electric discharge machine, a horizontal NC boring machine, a CNC lathe, and a multi-tasking machining center are being widely used in various industrial sites for the purpose of the corresponding work.

In general, various types of currently used machine tools each have a control panel to which a numerical control (NC) technology or a computerized numerical control (CNC) technology is applied. The control panel is provided with a multifunctional switch or button, and a monitor.

In addition, the machine tool includes a table on which a material, i.e., a workpiece is seated and which is transferred to machine the workpiece, a palette used to prepare the workpiece to be machined, a main shaft coupled to a tool or the workpiece and configured to be rotated, and a tailstock and a steady rest configured to support the workpiece during machining.

In general, the machine tool is provided with a transfer unit configured to transfer the table, a tool post, the main shaft, the tailstock, and the steady rest along a transfer shaft in order to perform various types of machining.

In addition, in general, the machine tool uses a plurality of tools in order to perform various types of machining, and a tool magazine or a turret is used in the form of a tool storage place for receiving and storing the plurality of tools.

In addition, in general, the machine tool is equipped with an automatic tool changer (ATC) configured to withdraw a specific tool from the tool magazine or remount the tool on the tool magazine based on an instruction of a numerical control unit in order to improve productivity of the machine tool.

In addition, in general, the machine tool is equipped with an automatic palette changer (APC) in order to minimize the non-processing time. The automatic palette changer (APC) automatically changes the palettes between a workpiece machining region and a workpiece loading region. The workpiece may be mounted on the palette.

In general, a servo motor is used in order to drive the automatic tool changer (ATC), the automatic pallet changer (APC), the tailstock, the steady rest, or the like in a machine tool.

In general, machine tools may be divided into a turning center and a machining center. The machining center can machine a workpiece using a rotating tool. On the other hand, the turning center can machine a rotating workpiece using a tool.

In general, a machine tool such as a machining center includes various individual devices that are fixed or movable relative to other fixed or moving devices in order to machine a workpiece. That is, a bed may be fixedly installed on the ground or a base, and a saddle may be installed to be movable in a horizontal, vertical, or height direction with respect to the bed. In addition, a column may be installed to be movable in a horizontal or vertical direction with respect to the saddle, a spindle may be installed to be movable in a horizontal, vertical, or height direction with respect to the column, and a tool may be mounted on a tip of the spindle.

When operating the machine tool, such as a spindle, a column, or a saddle, dynamic characteristics of each individual device from which vibration is generated change as the transfer shaft changes a position. That is, a frequency (Hz), i.e., the natural frequency or a compliance (μm/N) changes. The compliance may be interpreted as an amount of deformation that occurs when a unit force is applied. Accordingly, vibration increases in a weak vibration mode, which reduces processing accuracy and increases an occurrence rate of defective products, resulting in waste of resources, increased machining costs, and a decrease in productivity due to a decrease in cutting performance.

That is, for example, as shown in FIG. 1, in a vertical machining center, if the transfer shaft on the Z-axis changes in a situation where the Y-axis is at the same position, such as a case where the Z-axis is 0 mm when the Y-axis of the spindle is 255 mm (green solid line), the Z-axis is 50 mm when the Y-axis is 255 mm (blue solid line), the Z-axis is 100 mm when the Y-axis is 255 mm (red solid line), and the Z-axis is 150 mm when the Y-axis is 255 mm (black solid line), the frequency (Hz) on the horizontal axis or the compliance on the vertical axis changes, thereby changing the dynamic characteristics of the machine tool or individual device.

In addition, as shown in FIG. 2, when the Z-axis is lowered by 200 mm as in B2 from a state in which the Z-axis is at the initial position as in a B1 state, the rt value increases with respect to the central axis, and accordingly the vibration increases at the tip of the individual device such as the spindle, resulting in a change in dynamic characteristics. Accordingly, it becomes necessary to change the dynamic stiffness.

In this way, vibration inevitably occurs in a rotating machine tool due to the mass member, the rotation speed, and the like of the rotating body. In general, a system in which vibration is attenuated by attaching an additional mass member to equipment where vibration is generated is suggested.

As is known, this is a theory that cancels vibration by applying an equal force in an opposite direction to a magnitude of a force through which the vibration is transmitted. Such a tuned mass damper design theory was defined as an equation of motion by Den Hartog in 1934. According to this theory, vibration of equipment where the vibration is generated can be reduced by installing a tuned mass damper with the same frequency characteristics as the resonance frequency of the equipment in an opposite direction to an excitation direction.

However, the vibration reduction device and method of the machine tool of the related art are configured in a form of vibrating only with a fixed mass and frequency for the individual device of the machine tool and therefore cannot actively deal with a real-time change in dynamic characteristics of the individual device that vibration intensity and vibration direction are changed in real time, resulting in increased cost and time to reduce the vibration of the machine tool, and reducing stability and reliability of the machine tool.

In addition, the vibration reduction device and method of the machine tool of the related art cannot promptly, automatically and actively reduce vibration caused by change in dynamic characteristics, such as when changing a position of an individual device from which vibration is generated during machining of the machine tool, resulting in reduction in machining accuracy due to increased vibration and increase in an occurrence rate of defective products due to incorrect machining, causing waste of resources and increased machining costs.

Moreover, the vibration reduction device and method of the machine tool of the related art have problems that a vibration reduction unit mounted on the individual device of the machine tool is large in size, is not easy to change a design, and cannot be miniaturized, which increases the manufacturing cost and maintenance cost of the vibration reduction device, causes inconvenience to an operator, and reduces space utilization, making it impossible to implement a compact machine tool as a whole.

Furthermore, the vibration reduction device and method of the machine tool of the related art cannot generate vibration that is opposite to vibration caused immediately and actively by change in dynamic characteristics that change in real time in accordance with a real-time position change or rotational speed for machining a workpiece in the individual device, resulting in reductions in accuracy and stability of vibration reduction, causing dissatisfaction among consumers and users, leading to a decrease in sales, and reducing productivity due to increased non-processing time.

DISCLOSURE

Summary

The present disclosure has been made in an effort to solve the above problems, and an object of the present disclosure is to provide an active vibration reduction device and method of a machine tool, wherein vibration generated from an individual unit is automatically and actively reduced in real time by changing an intensity of excitation and a direction of excitation in real time in an excitation unit in accordance with an actual machining state of an individual device or a state caused by a change in position of the individual device, the excitation being opposite to vibration data of the individual device sensed by a sensing unit installed adjacent to a vibration generation part of the individual device where the excitation unit is arranged, and accordingly, it is possible to maximize machining accuracy of the machine tool and improve safety and reliability of the machine tool.

Another object of the present disclosure is to provide an active vibration reduction device and method of a machine tool, wherein a fixed unit and a vibration unit of an excitation unit are implemented in a sliding manner using an electromagnet so that vibration generated from an individual device is actively reduced in real time by accurately and promptly generating, in the excitation unit, excitation having a magnitude and direction opposite to vibration data of the individual device sensed by a sensing unit, and accordingly, it is possible to reduce a production cost and a maintenance cost through miniaturization of the excitation unit, maximize space utilization, promote convenience of an operator, reduce a manufacturing cost, an installation cost, and a maintenance cost by modularizing the excitation unit and making the excitation unit compact, and improve machining productivity by minimizing non-processing time, such as analysis for real-time active vibration reduction.

In order to achieve the aforementioned objects, an active vibration reduction device of a machine tool according to the present disclosure includes: an excitation unit arranged on each of individual devices constituting the machine tool, from which vibrations are generated during an operation of the machine tool, and configured to generate excitation; a sensing unit installed adjacent to a vibration generation part of the individual device where the excitation unit is arranged, and configured to sense vibration of the individual device; and a control unit configured to control an operation of the excitation unit, wherein the control unit is configured to automatically reduce in real time vibrations generated from the individual unit by actively changing excitation generated by the excitation unit so that excitation opposite to vibration data of the individual device is generated in real time in accordance with the vibration data of the individual device sensed by the sensing unit.

In addition, in another preferred exemplary embodiment of the active vibration reduction device of a machine tool according to the present disclosure, the control unit of the active vibration reduction device of a machine tool may include a data storage unit for storing data for automatically and actively reducing the vibration of the individual device by causing the excitation unit to generate the excitation opposite to the vibration data of the individual device in accordance with the vibration data of the individual device sensed by the sensing unit; an analysis unit configured to analyze vibration information on the individual device by analyzing the vibration data sensed by the sensing unit and the data stored in the data storage unit; a calculation unit configured to calculate an intensity and a direction of the excitation generated by the excitation unit through an analysis result by the analysis unit and the data stored in the data storage unit; and a reduction unit configured to automatically reduce the vibration of the individual device by actively changing and generating excitation opposite to that of the individual device in real time in the excitation unit in accordance with a calculation result by the calculation unit.

In addition, in another preferred exemplary embodiment of the active vibration reduction device of a machine tool according to the present disclosure, the data storage unit of the control unit of the active vibration reduction device of a machine tool may include a basic data storage unit for storing data for the individual device of the machine tool, a machining program, and data for a drive program; a reference data storage unit for storing data on a reference value for confirming an occurrence of vibration for each individual device and a gain value for each individual device; a sensing data storage unit for storing data sensed by the sensing unit; and a real-time data storage unit for storing the analysis result by the analysis unit, the calculation result by the calculation unit, and a reduction result by the reduction unit in real time.

In addition, in another preferred exemplary embodiment of the active vibration reduction device of a machine tool according to the present disclosure, the analysis unit of the control unit of the active vibration reduction device of a machine tool may include a confirmation unit configured to confirm whether vibration occurs in each individual device when the machine tool operates, through the data sensed by the sensing unit and the data stored in the data storage unit; and a comparison unit configured to compare a real-time vibration sensing value of the individual device stored in the sensing data storage unit with the reference value stored in the reference data storage unit when it is confirmed that vibration has occurred as a confirmation result by the confirmation unit.

In addition, in another preferred exemplary embodiment of the active vibration reduction device of a machine tool according to the present disclosure, the calculation unit of the control unit of the active vibration reduction device of a machine tool may include a speed calculation unit configured to calculate a speed of the individual device in accordance with the analysis result by the analysis unit and the data stored in the data storage unit when it is determined that the sensing value exceeds the reference value as a comparison result by the comparison unit; an excitation calculation unit configured to calculate an excitation value to be generated by the excitation unit in accordance with the analysis result by the analysis unit, a calculation result by the speed calculation unit, and the data stored in the data storage unit; a current calculation unit configured to calculate a current value to be transmitted to the excitation unit in accordance with the analysis result by the analysis unit, a calculation result by the excitation calculation unit, and the data stored in the data storage unit; and a determination unit configured to determine a direction of excitation to be generated by the excitation unit in accordance with the sensing result by the sensing unit, the analysis result by the analysis unit, a calculation result by the current calculation unit, and the data stored in the data storage unit.

In addition, in another preferred exemplary embodiment of the active vibration reduction device of a machine tool according to the present disclosure, the reduction unit of the control unit of the active vibration reduction device of a machine tool may include a processing unit configured to transmit a current signal to the excitation unit so that the excitation unit generates excitation having a vibration intensity and a vibration direction opposite to the vibration data of the individual device in accordance with the sensing result by the sensing unit, the analysis result by the analysis unit, the calculation by the calculation unit, and the data stored in the data storage unit; and a feedback unit configured to receive feedback of sensing information received by the sensing unit and information about excitation generated by the excitation unit after the excitation unit generates excitation.

In addition, in another preferred exemplary embodiment of the active vibration reduction device of a machine tool according to the present disclosure, the excitation unit of the active vibration reduction device of a machine tool may include a housing unit; a fixed unit fixedly installed on the housing unit and configured to selectively form an electromagnetic field; an actuator unit configured to transmit a current applied to the fixed unit under control of the control unit; a guide unit installed on a part of the housing unit; and a vibration unit slidably coupled to the guide unit in order to generate excitation when a specific electromagnetic field is formed by a current value applied through the actuator unit.

In addition, in another preferred exemplary embodiment of the active vibration reduction device of a machine tool according to the present disclosure, the excitation unit of the active vibration reduction device of a machine tool may further include a damper unit arranged between the housing unit and the vibration unit.

In addition, in another preferred exemplary embodiment of the active vibration reduction device of a machine tool according to the present disclosure, the housing unit of the vibration unit of the active vibration reduction device of a machine tool may include a base part coupled to the individual device; and a support part extending from both sides of the base part to support the fixed unit and the guide unit.

In addition, in another preferred exemplary embodiment of the active vibration reduction device of a machine tool according to the present disclosure, the fixed unit of the excitation unit of the active vibration reduction device of a machine tool may include a stator core both sides of which are fixedly coupled to the support part; and a stator on which a coil is wound while surrounding an outer peripheral surface of the stator core.

In addition, in another preferred exemplary embodiment of the active vibration reduction device of a machine tool according to the present disclosure, the vibration unit of the excitation unit of the active vibration reduction device of a machine tool may include a slide part configured to have a predetermined weight while accommodating the fixed unit therein; and a permanent magnet fixedly installed on an inner surface of the slide part to be spaced apart from the stator by a predetermined distance.

In addition, in another preferred exemplary embodiment of the active vibration reduction device of a machine tool according to the present disclosure, the guide unit of the excitation unit of the active vibration reduction device of a machine tool may include a rail part both sides of which are coupled to the support part so as to be parallel to the stator core; and a block part formed on an outer surface of the slide part so as to guide movement of the slide part and configured to slide along the rail part.

In addition, in another preferred exemplary embodiment of the active vibration reduction device of a machine tool according to the present disclosure, the excitation unit of the active vibration reduction device of a machine tool may be arranged in plural on one individual device and may be configured to generate excitation with multiple degrees of freedom under control of the control unit.

In order to achieve the aforementioned objects, an active vibration reduction method of a machine tool according to the present disclosure includes: storing data for automatically reducing vibrations generated from each of individual devices constituting the machine tool, from which vibrations are generated during an operation of the machine tool, in real time by actively changing and generating excitation opposite to vibration data of each individual device in real time in an excitation unit; sensing vibrations of the individual device by a sensing unit installed adjacent to a vibration generation part of the individual device where the excitation unit is installed; confirming whether vibration has occurred in the individual device; comparing a sensing value with a pre-stored reference value when it is confirmed that vibration has occurred in the individual device; calculating a speed of the individual device in accordance with a sensing result, a confirmation result, a comparison result, and pre-stored data when the sensing value exceeds the reference value as a result of the comparison; calculating an excitation value to be generated by the excitation unit in accordance with the sensing result, the confirmation result, the comparison result, the speed calculation result, and the pre-stored data; calculating a current value to be transmitted to the excitation unit in accordance with the sensing result, the confirmation result, the comparison result, the excitation value calculation result, and the pre-stored data; determining a direction of excitation to be generated by the excitation unit in accordance with the sensing result, the confirmation result, the comparison result, the current value calculation result, and the pre-stored data; and causing the excitation unit to generate excitation by transmitting a current signal to the excitation unit so that the excitation unit generates excitation having a vibration intensity and a vibration direction opposite to vibration data of the individual device in accordance with the sensing result, the confirmation result, the comparison result, the current value calculation result, the determination result, and the pre-stored data.

In the active vibration reduction device and method of a machine tool according to the present disclosure, vibration generated from the individual unit is automatically and actively reduced in real time by changing an intensity of excitation and a direction of excitation in real time in the excitation unit so as to comply with an actual machining state of the individual device or a change in dynamic characteristics caused by a change in position of the individual device, the excitation being opposite to vibration data of the individual device sensed by the sensing unit installed adjacent to the vibration generation part of the individual device where the excitation unit is arranged, and accordingly, it is possible to maximize machining accuracy of the machine tool and improve safety and reliability of the machine tool.

In addition, in the active vibration reduction device and method of a machine tool according to the present disclosure, the fixed unit and vibration unit of the excitation unit are implemented in a sliding manner using an electromagnet so that excitation having a magnitude and direction opposite to the vibration data of the individual device sensed by the sensing unit are accurately and promptly generated in the excitation unit to actively reduce in real time vibrations generated from the individual device, and accordingly, it is possible to reduce production and maintenance costs through miniaturization of the excitation unit, maximize space utilization, and make the machine tool compact.

Moreover, in the active vibration reduction device and method of a machine tool according to the present disclosure, the current and direction transmitted to the excitation unit are conveniently and promptly adjusted through the control unit to automatically control promptly and accurately the vibration intensity and vibration direction of excitation generated in the excitation unit. Accordingly, it is possible to improve machining productivity by minimizing non-processing time associated with analysis, maintenance and the like for vibration reduction in accordance with the dynamic characteristics that change in real time in the individual device.

Furthermore, in the active vibration reduction device and method of a machine tool according to the present disclosure, the vibration occurring in the individual device is reduced automatically and actively through the control unit and excitation unit in accordance with changes in magnitude and intensity of the vibration, and accordingly, it is possible to promote the convenience of an operator, reduce production and maintenance costs and time, and increase exports.

DETAILED DESCRIPTION OF CERTAIN INVENTIVE EMBODIMENT

Figure 1:
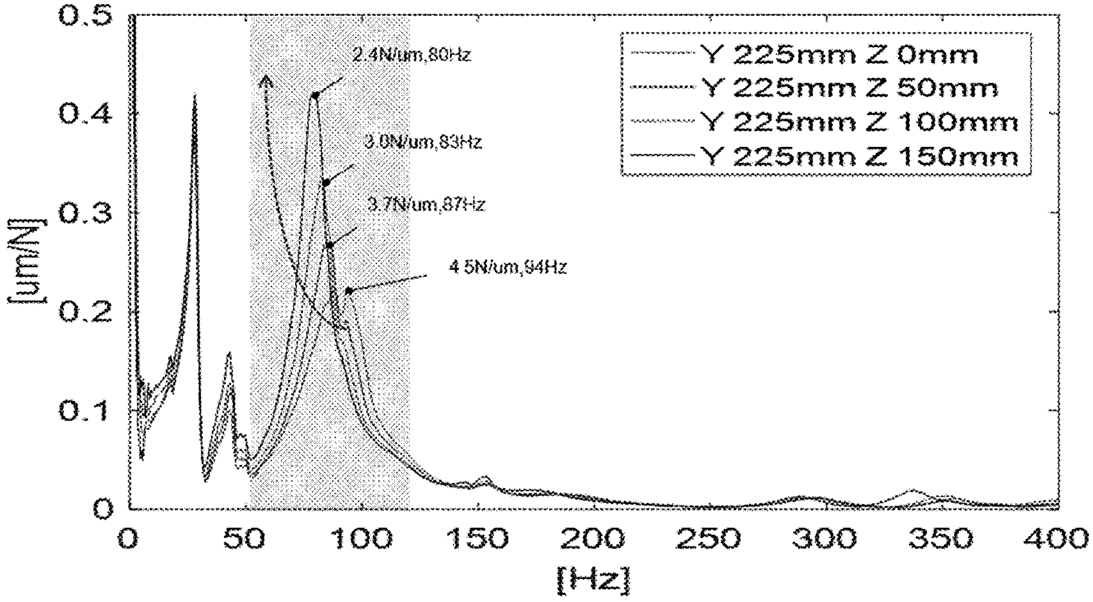
FIG. 1 shows a graph of vibration generation due to movement in Y-axis and Z-axis directions of a machine tool of the related art.
Figure 2:
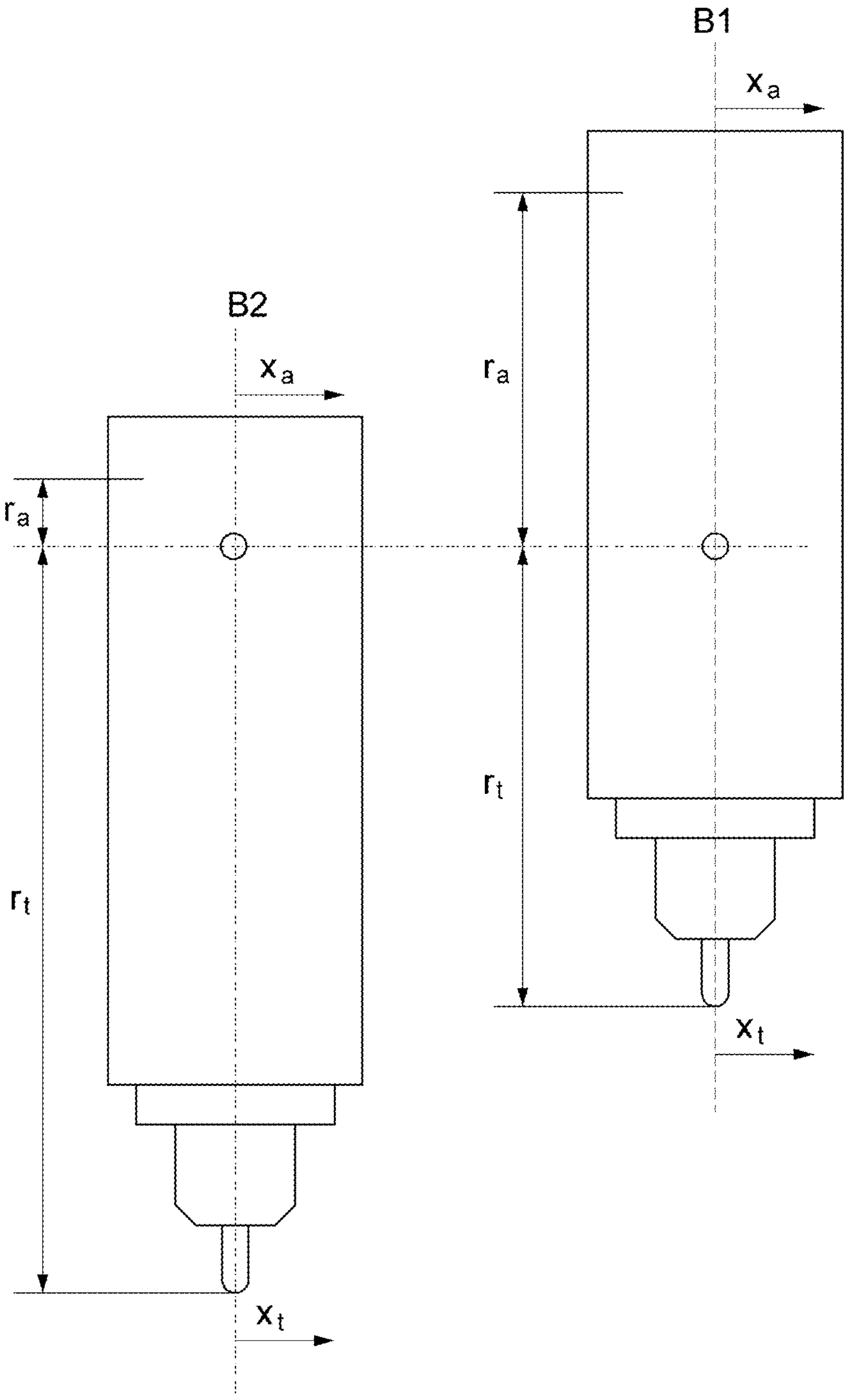
FIG. 2 shows a conceptual diagram of an increase in vibration generation due to a change in the Z-axis position of a spindle of the machine tool.

Hereinafter, an active vibration reduction device and method of a machine tool according to an exemplary embodiment of the present disclosure will be described in detail with respect to the drawings. The following exemplary embodiments are provided as examples for fully transferring the spirit of the present disclosure to those skilled in the art. Therefore, the present disclosure is not limited to the exemplary embodiments described below and may be specified as other aspects. Further, in the drawings, a size and a thickness of the apparatus may be exaggerated for convenience. Like reference numerals indicate like constituent elements throughout the specification.

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art can fully understand the scope of the present disclosure. The present disclosure will be defined only by the scope of the appended claims. Like reference numerals indicate like constituent elements throughout the specification. In the drawings, sizes and relative sizes of layers and regions may be exaggerated for clarity of description.

The terms used in the present specification are for explaining the exemplary embodiments, not for limiting the present disclosure. Unless particularly stated otherwise in the present specification, a singular form also includes a plural form. The terms such as "comprise (include)" and/or "comprising (including)" used in the specification do not exclude presence or addition of one or more other constituent elements, steps, operations, and/or elements, in addition to the mentioned constituent elements, steps, operations, and/or elements.

Figure 3:
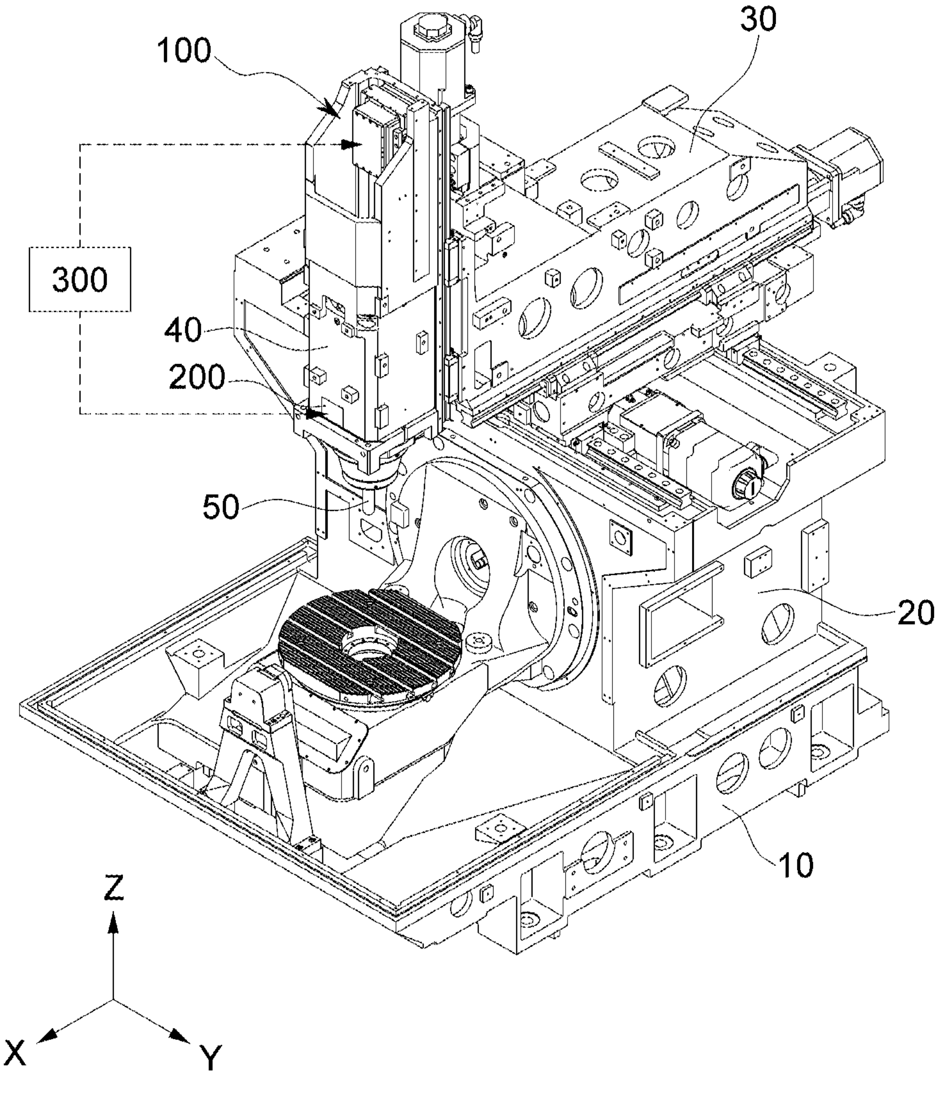
FIG. 3 shows a conceptual diagram of a machine tool in a state in which an active vibration reduction device of a machine tool according to an exemplary embodiment of the present disclosure is installed.
Figure 4:
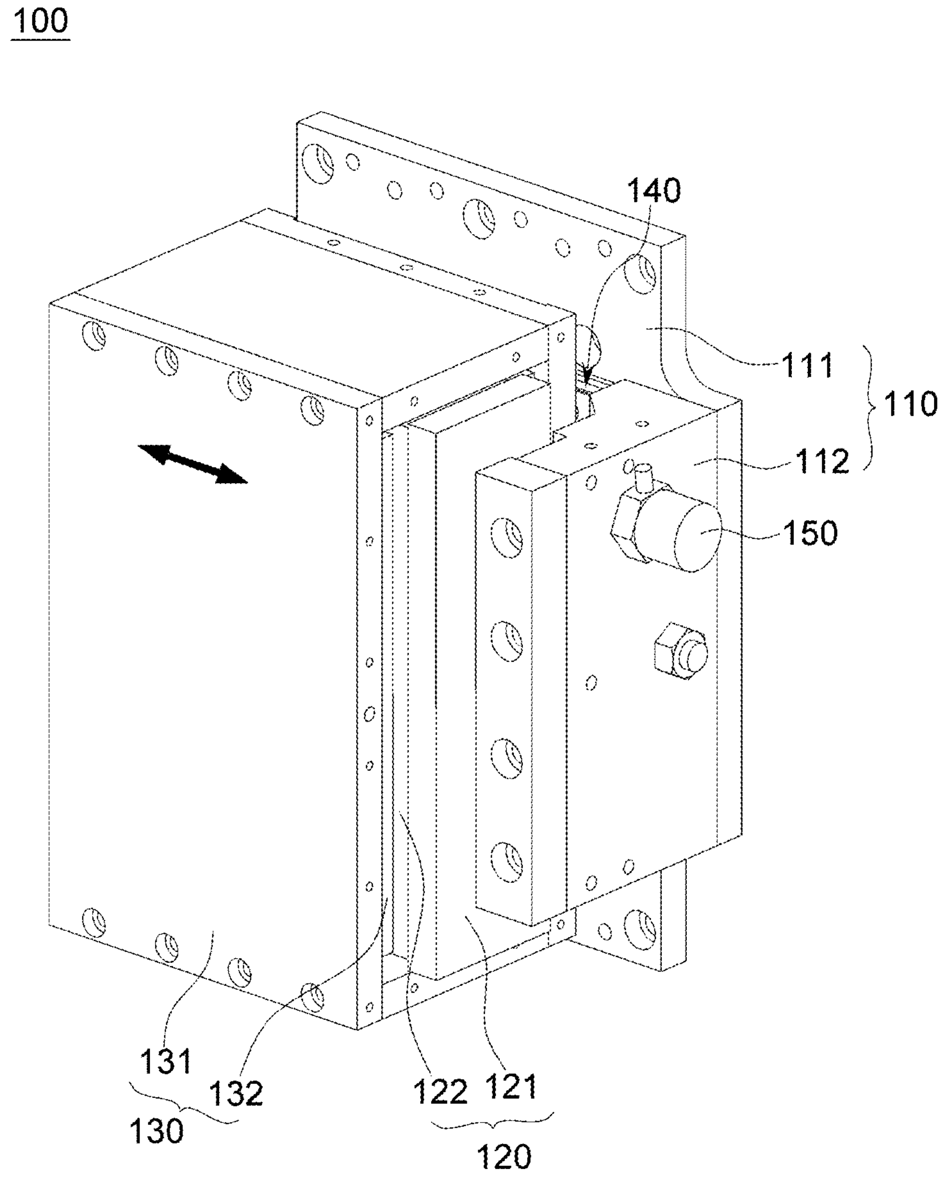
FIG. 4 shows a front perspective view of an excitation unit of the active vibration reduction device of a machine tool according to an exemplary embodiment of the present disclosure.
Figure 5:
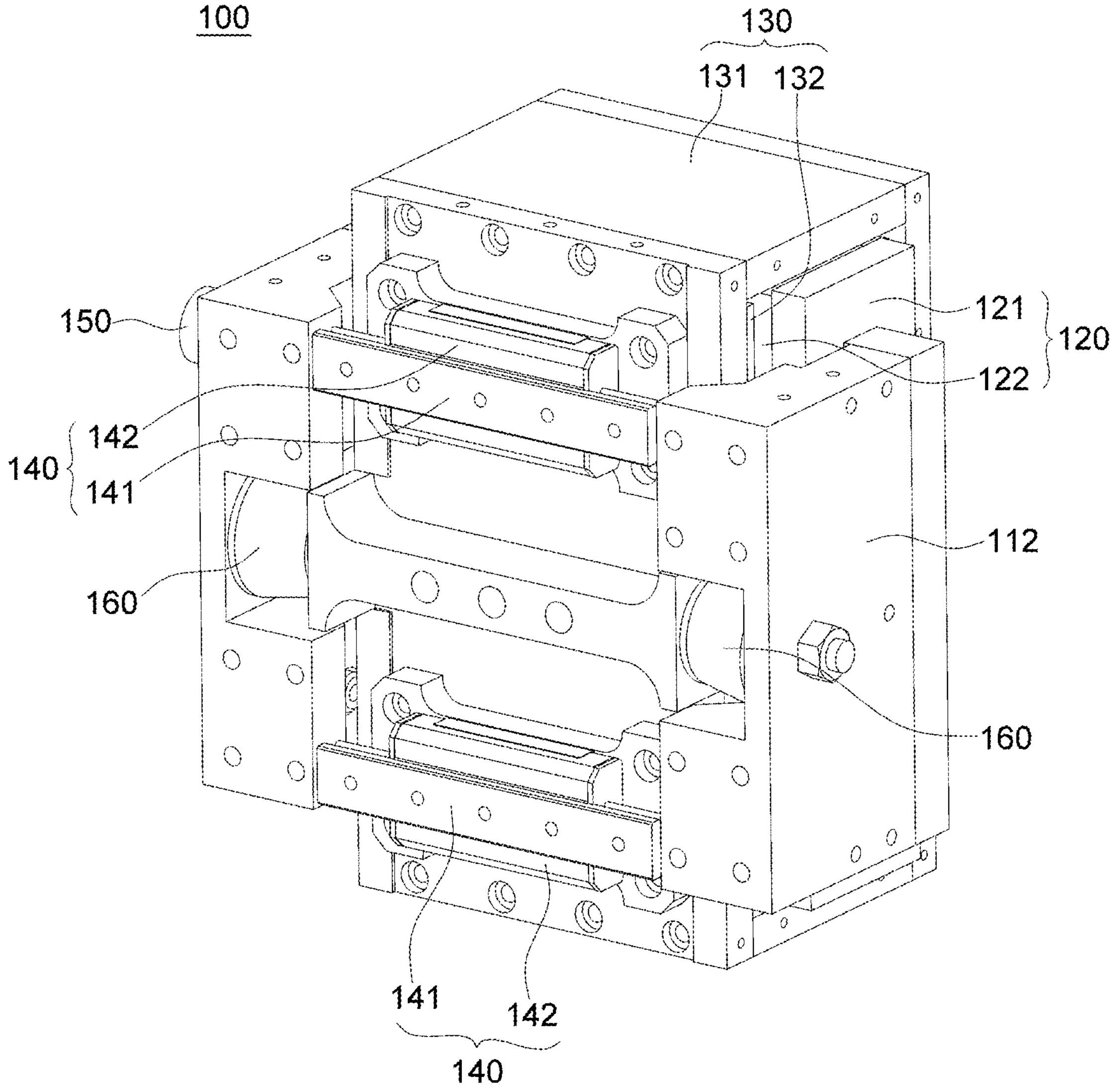
FIG. 5 shows a rear perspective view of the excitation unit of the active vibration reduction device of a machine tool according to an exemplary embodiment of the present disclosure.
Figure 6:
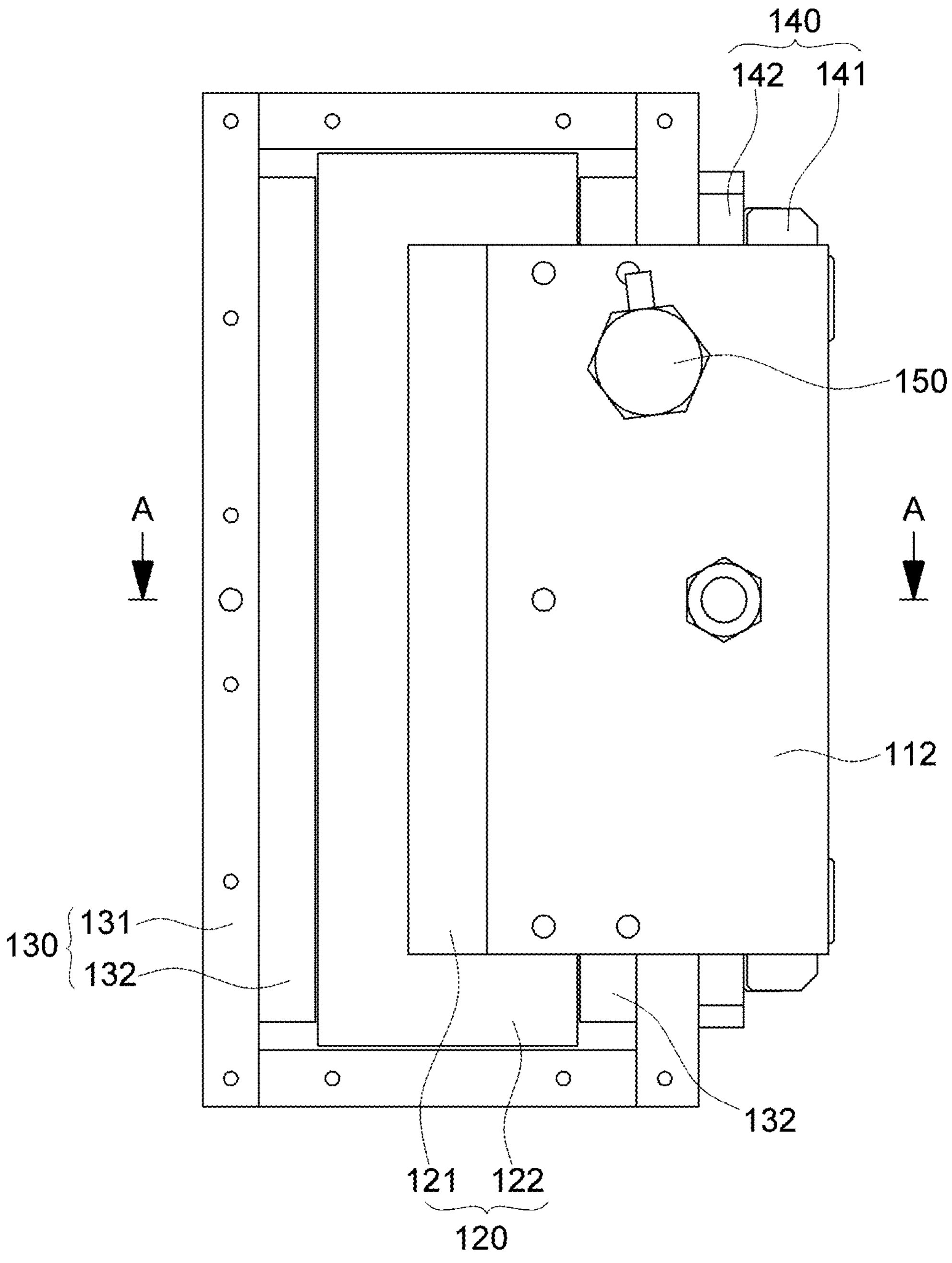
FIG. 6 shows a side view of the excitation unit of the active vibration reduction device of a machine tool with a base part removed in FIG. 4.
Figure 7:
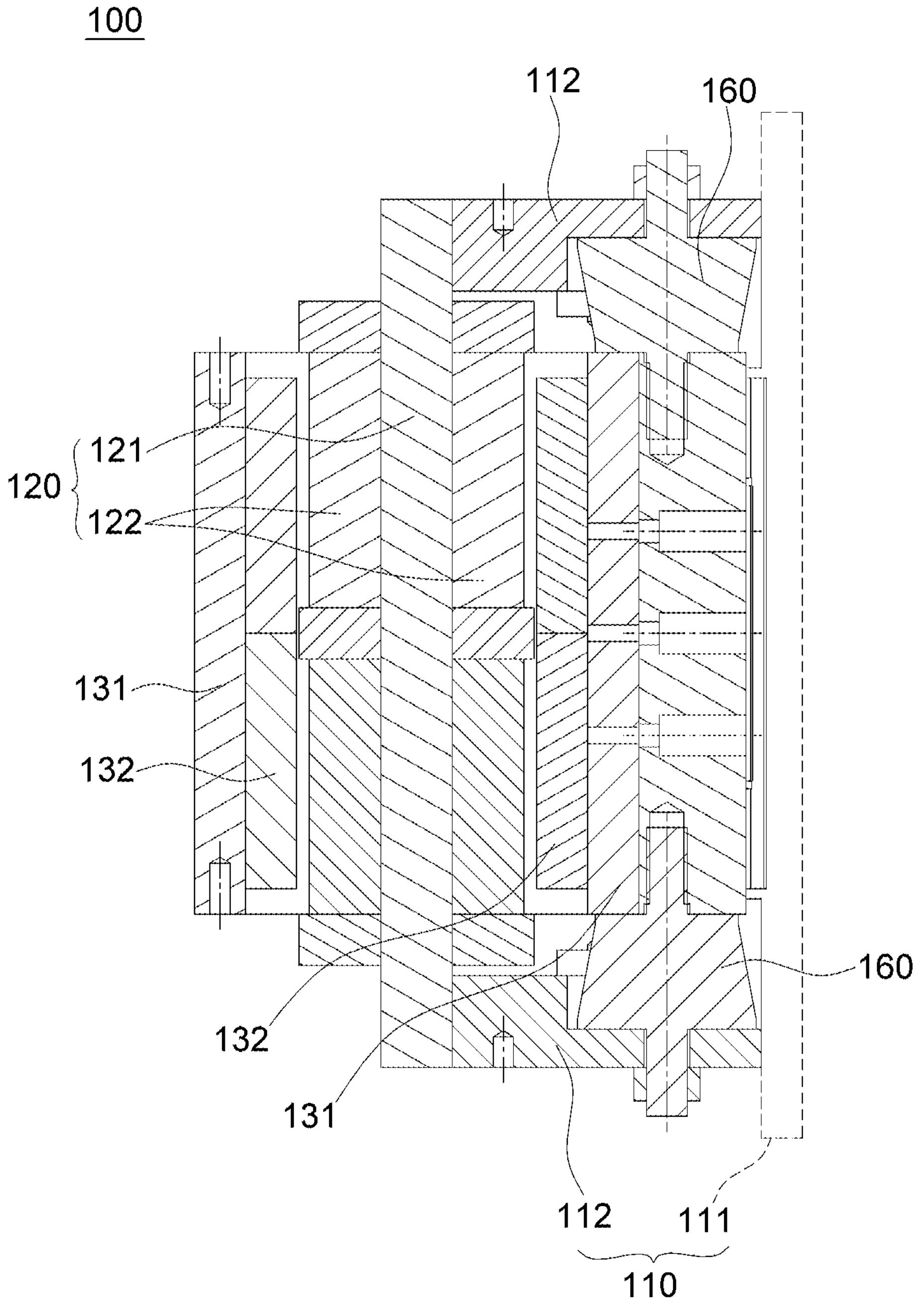
FIG. 7 is a cross-sectional view along a line A-A in FIG. 6.
Figure 8:
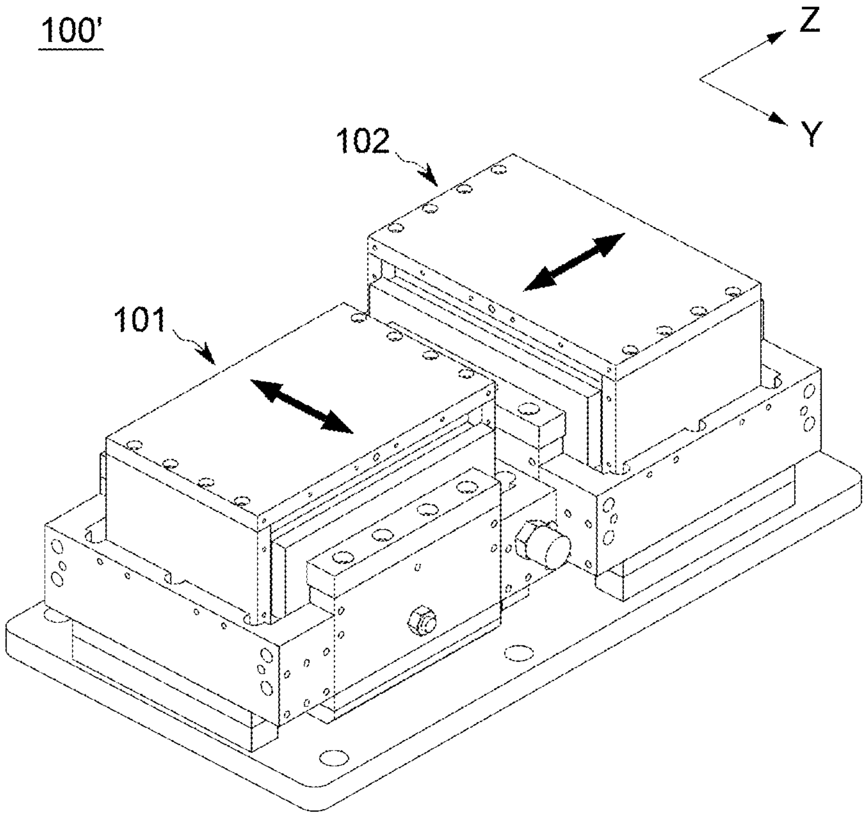
FIG. 8 is a conceptual diagram showing that vibration can be reduced with two degrees of freedom in the active vibration reduction device of a machine tool according to an exemplary embodiment of the present disclosure.
Figure 9:
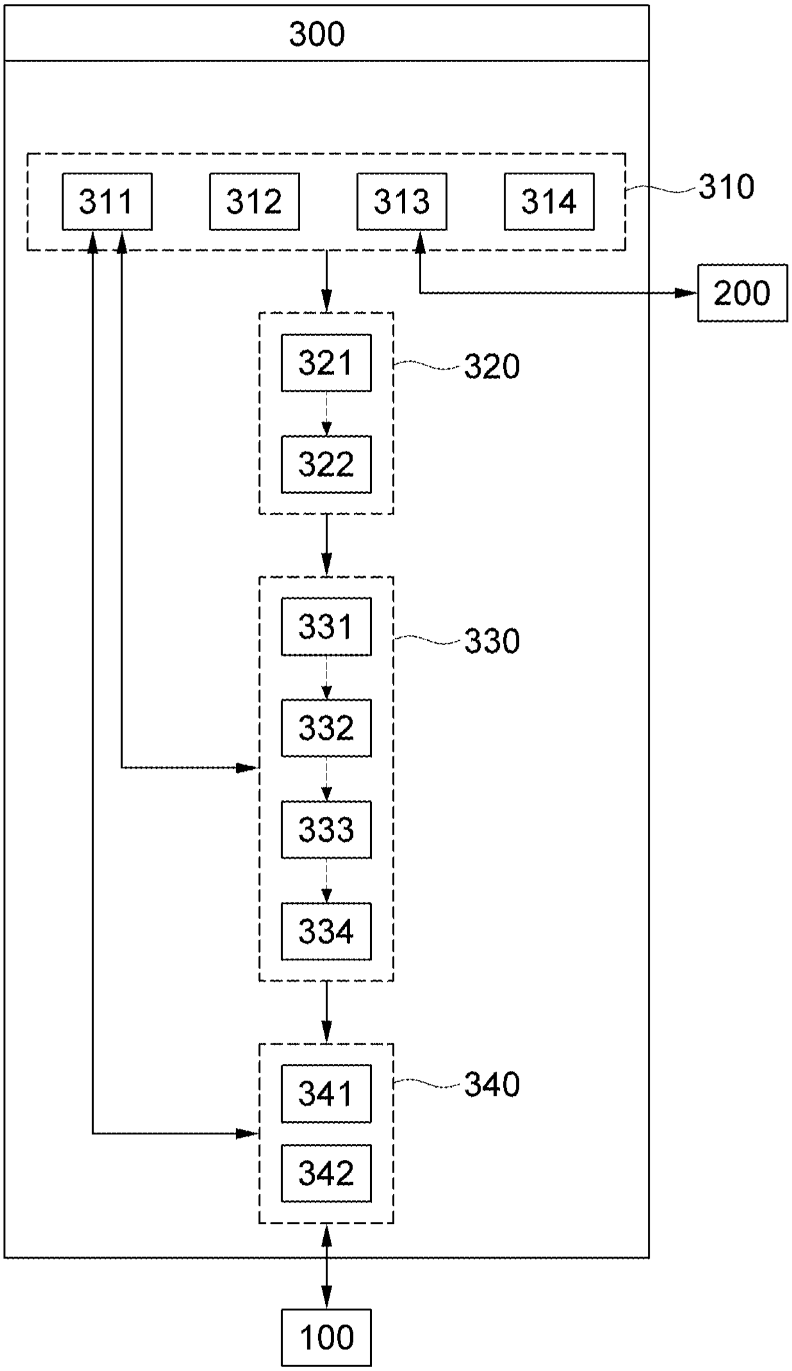
FIG. 9 shows a configuration view of a control unit of the active vibration reduction device of a machine tool according to an exemplary embodiment of the present disclosure.
Figure 10:
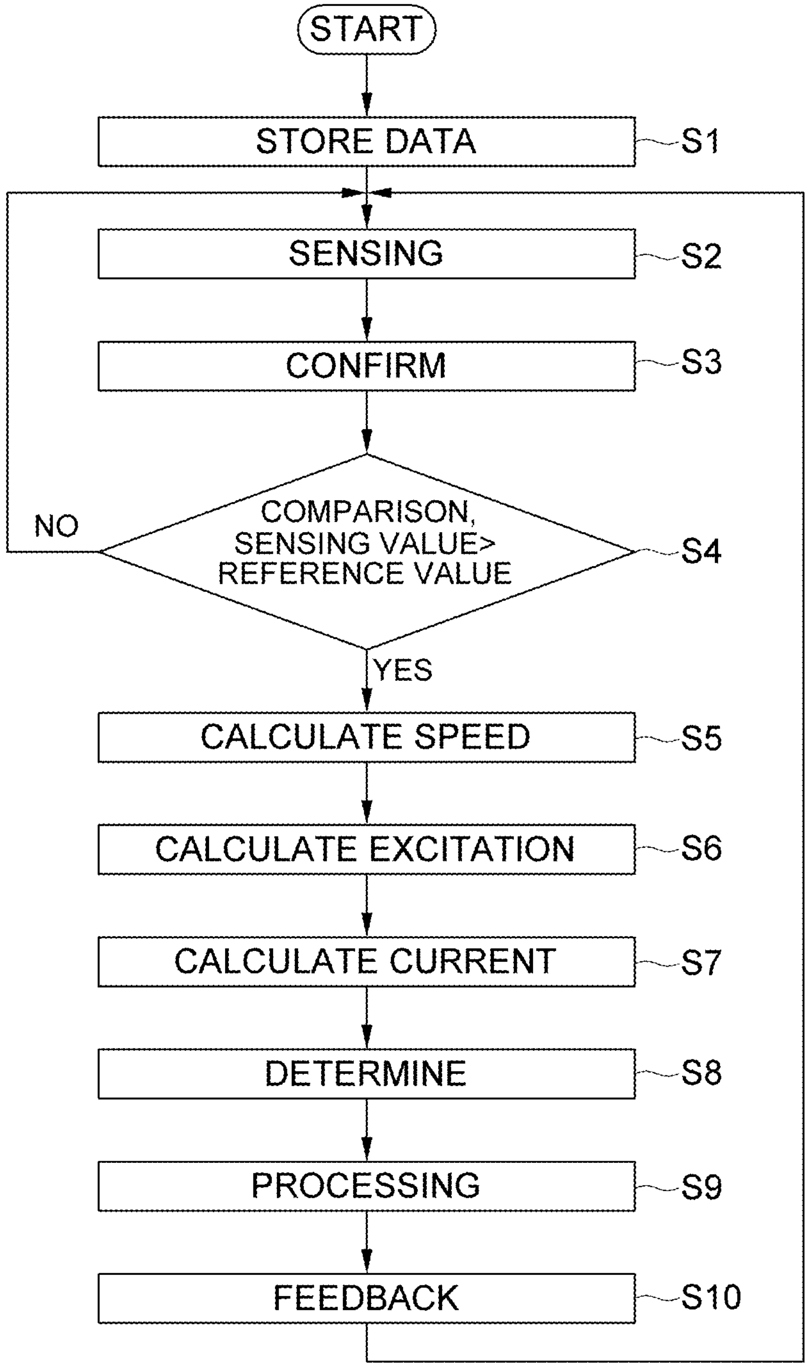
FIG. 10 shows a flowchart of an active vibration reduction method of a machine tool according to an exemplary embodiment of the present disclosure.

FIG. 3 shows a conceptual diagram of a machine tool in a state in which an active vibration reduction device of a machine tool according to an exemplary embodiment of the present disclosure is installed, FIG. 4 shows a front perspective view of an excitation unit of the active vibration reduction device of a machine tool according to an exemplary embodiment of the present disclosure, and FIG. 5 shows a rear perspective view of the excitation unit of the active vibration reduction device of a machine tool according to an exemplary embodiment of the present disclosure. FIG. 6 shows a side view of the excitation unit of the active vibration reduction device of a machine tool with a base part removed in FIG. 4, and FIG. 7 is a cross-sectional view along a line A-A in FIG. 6. FIG. 8 is a conceptual diagram showing that vibration can be reduced with two degrees of freedom in the active vibration reduction device of a machine tool according to an exemplary embodiment of the present disclosure. FIG. 9 shows a configuration view of a control unit of the active vibration reduction device of a machine tool according to an exemplary embodiment of the present specification. FIG. 10 shows a flowchart of an active vibration reduction method of a machine tool according to an exemplary embodiment of the present disclosure. FIGS. 11 to 15 show graphs showing a state in which vibration is reduced by the active vibration reduction device and method of a machine tool according to an exemplary embodiment of the present disclosure.

An active vibration reduction device 1 of a machine tool according to an exemplary embodiment of the present disclosure will be described with reference to FIGS. 3 to 9. As shown in FIG. 3, the active vibration reduction device 1 of a machine tool according to an exemplary embodiment of the present disclosure includes an excitation unit 100, a sensing unit 200, and a control unit 300.

The excitation unit 100 is arranged on each of individual devices constituting the machine tool, from which vibrations are generated during an operation of the machine tool, and generates excitation. That is, in general, the machine tool includes various individual devices that are fixed or movable relative to other fixed or moving devices in order to machine a workpiece. For example, a bed 10 may be fixedly installed on the ground or a base, and a saddle 20 may be installed to be movable in a horizontal, vertical, or height direction with respect to the bed. In addition, a column 30 is installed to be movable in a horizontal, vertical, or height direction with respect to the saddle, a spindle 40 is installed to be movable in a horizontal, vertical, or height direction with respect to the column, a tool 50 is rotatably mounted on a tip of the spindle, and a workpiece is machined using the rotating tool. In this way, in a state in which the machine tool is operating for machining a workpiece or for non-machining, when the spindle, the saddle, and the column that make up the individual devices move or the tool rotates, the dynamic characteristics change, causing vibration. A transfer unit that transfers each of the individual devices in an axial direction is provided, and the transfer unit operates through a separate control device that controls the machine tool. Although not shown in the drawings, the transfer unit performs the function of transferring the saddle, column, and spindle. Such a transfer unit may be composed of a ball screw, a linear guide, and a linear guide block. In addition, the linear guide may be formed as an LM guide rail.

The sensing unit 200 is installed adjacent to a vibration generation part of the individual device where the excitation unit is arranged, and senses vibration of the individual device. In addition, in a case where the vibration generation part of the individual device where the excitation unit is arranged is provided in plural places, the sensing unit may be installed in a part where the most vibration is generated or may be installed in plural at the vibration generation parts, as needed. In addition, it is most desirable for such an excitation unit to be installed adjacent to the vibration generation part of each individual device, like the sensing unit. However, unlike the sensing unit, the excitation unit is formed to have a predetermined size for generating excitation, and therefore, has space constraints or the like. Accordingly, the excitation unit is installed at an appropriate place of the individual device and generates excitation under control of the control unit to actively reduce vibration of the individual device in real time. That is, as shown in FIG. 3, for example, when the individual device is the spindle, vibration most occurs in a part where the tool is mounted and rotates, so it is preferable that the excitation unit is installed adjacent to a part of the spindle where the tool is mounted. However, due to constraints such as a size of the excitation unit, the excitation unit is installed in a part of the spindle where a space is secured, and the sensing unit is installed adjacent to the vibration part of the spindle where the tool is mounted, sensing the vibration generated from the spindle, which is an individual device, and transmitting a sensing result to the control unit. Additionally, the sensing unit may be formed as a sensor that senses an acceleration of the individual device, although not necessarily limited thereto.

The control unit 300 controls an operation of the excitation unit. That is, the control unit performs a function of automatically reducing in real time vibrations generated from the individual unit by actively changing excitation generated by the excitation unit so that the excitation opposite to vibration data of the individual device is generated in real time in accordance with the vibration data of the individual device sensed by the sensing unit.

In this way, in the active vibration reduction device of a machine tool according to an exemplary embodiment of the present disclosure, vibrations generated from the individual unit are automatically and actively reduced in real time by changing an intensity of excitation and a direction of excitation in real time in an excitation unit so as to comply with an actual machining state of the individual device or a change in dynamic characteristics caused by a change in position of the individual device, the excitation being opposite to vibration data of the individual device sensed by the sensing unit installed adjacent to the vibration generation part of the individual device where the excitation unit is arranged, and accordingly, it is possible to maximize machining accuracy of the machine tool and improve safety and reliability of the machine tool.

In addition, although not shown in the drawings, the control unit of the active vibration reduction device of a machine tool according to an exemplary embodiment of the present disclosure includes a programmable logic controller (PLC). The PLC performs communication with the spindle, the column, the saddle, the transfer unit thereof, the control unit, and the like in accordance with a predetermined protocol, and performs a function of executing a control command through the communication. That is, the PLC drives the transfer unit for the spindle, the column, and the saddle, spindle rotation, magazine, and the like in accordance with a numerical control program of the control unit.

Additionally, the control unit includes numerical control (NC) or computerized numerical control (CNC) and has various numerical control programs built therein. That is, the control unit has a built-in drive program for the transfer unit that transfers the spindle, column, and saddle of the machine tool, and the program is automatically loaded and operated as the control unit is driven. Additionally, the control unit performs communication with the PLC, an analysis unit, a data storage unit, a calculation unit, and a reduction unit in accordance with a predetermined protocol.

In addition, although not shown in the drawings, according to a preferred exemplary embodiment of the present disclosure, the control unit includes a main operation unit, and the main operation unit includes a screen display program, and a data input program according to a screen display selection, displays a software switch on a display screen according to an output of the screen display program, and recognizes on/off of the software switch to perform a function of issuing an input/output command of a machine operation.

In addition, although not particularly limited thereto, the main operation unit is provided with a monitor that is installed on a housing, a case, or one side of the machine tool to display various function switches or buttons and various information.

As shown in FIGS. 3 and 9, the control unit 300 of the active vibration reduction device 1 of a machine tool according to an exemplary embodiment of the present disclosure includes a data storage unit 310, an analysis unit 320, a calculation unit 330, and a reduction unit 340.

The data storage unit 310 stores, in advance or in real time, data for automatically and actively reducing the vibration of the individual device by causing the excitation unit to generate the excitation opposite to the vibration data of the individual device in accordance with the vibration data of the individual device sensed by the sensing unit.

The analysis unit 320 analyzes vibration information on the individual device by analyzing the vibration data sensed by the sensing unit and the data stored in the data storage unit.

The calculation unit 330 calculates an intensity and a direction of the excitation generated by the excitation unit through an analysis result by the analysis unit and the data stored in the data storage unit.

The reduction unit 340 performs a function of automatically reducing the vibration of the individual device by actively changing and generating excitation opposite to that of the individual device in real time in the excitation unit in accordance with a calculation result by the calculation unit.

In this way, in the active vibration reduction device of a machine tool according to the present disclosure, the current and direction transmitted to the excitation unit are conveniently and promptly adjusted through the control unit to automatically control promptly and accurately the vibration intensity and vibration direction of excitation generated in the excitation unit. Accordingly, it is possible to improve machining productivity by minimizing non-processing time associated with analysis, maintenance and the like for vibration reduction in accordance with the dynamic characteristics that change in real time in the individual device.

As shown in FIG. 9, the data storage unit 310 of the control unit 100 of the active vibration reduction device of a machine tool according to an exemplary embodiment of the present disclosure includes a basic data storage unit 311, a reference data storage unit 312, and a sensing data storage unit 313, and a real-time data storage unit 314.

The basic data storage unit 311 stores data for the individual device of the machine tool, a machining program, and data for a drive program.

The reference data storage unit 312 stores data on a reference value for confirming an occurrence of vibration for each individual device and a gain value for each individual device.

The sensing data storage unit 313 stores data sensed by the sensing unit.

The real-time data storage unit 314 stores the analysis result by the analysis unit, the calculation result by the calculation unit, and the reduction result by the reduction unit in real time.

As shown in FIG. 9, the analysis unit 320 of the control unit 100 of the active vibration reduction device of a machine tool according to an exemplary embodiment of the present disclosure includes a confirmation unit 321 and a comparison unit 322.

The confirmation unit 321 confirms whether vibration occurs in each individual device by an acceleration signal when the machine tool operates, through the data sensed by the sensing unit and the data stored in the data storage unit.

The comparison unit 322 compares the real-time vibration sensing value of the individual device stored in the sensing data storage unit with the reference value stored in the reference data storage unit when it is confirmed that vibration has occurred as a confirmation result by the confirmation unit.

As shown in FIG. 9, the calculation unit 330 of the control unit 100 of the active vibration reduction device of a machine tool according to an exemplary embodiment of the present disclosure includes a speed calculation unit 331, an excitation calculation unit 332, and a current calculation unit 333, and a determination unit 334.

The speed calculation unit 331 calculates a speed of the individual device in accordance with the analysis result by the analysis unit and the data stored in the data storage unit when it is determined that the sensing value exceeds the reference value (sensing value>reference value) as a comparison result by the comparison unit. Specifically, the speed calculation unit calculates the speed by integrating the acceleration signal, which is a vibration signal. That is, a force (F) that reduces vibration is pr oportional to the speed (V) (F=CV), so the acceleration signal is integrated through the sensing unit and the speed is calculated in the speed calculation unit.

The excitation calculation unit 332 calculates an excitation value to be generated by the excitation unit in accordance with the analysis result by the analysis unit, the calculation result by the speed calculation unit, and the data stored in the data storage unit. That is, the excitation calculation unit calculates the excitation value by multiplying the speed calculated through the speed calculation unit by a corresponding gain value stored in the reference data storage unit (excitation value=speed (V)×gain (G)).

The current calculation unit 333 calculates a current value to be transmitted to the excitation unit in accordance with the analysis result by the analysis unit, the calculation result by the excitation calculation unit, and the data stored in the data storage unit. That is, the current calculation unit calculates the current value through Mathematical Equation 1.

[Mathematical Equation 1]

$$\frac{X(s)}{F_d(s)} = \frac{G_{aFd}}{1 + C(s)G_{aIa}(s)} \cdot \frac{1}{s^2}$$

The determination unit 334 determines a direction of excitation to be generated by the excitation unit in accordance with the sensing result by the sensing unit, the analysis result by the analysis unit, the calculation result by the current calculation unit, and the data stored in the data storage unit. That is, the determination unit performs functions of transmitting the current value calculated through the current calculation unit to the excitation unit and determining a direction of excitation so that a sliding direction of a vibration unit described below can be determined by controlling input and output directions of current when generating vibration by sliding the vibration unit.

As shown in FIG. 9, the reduction unit 340 of the control unit 100 of the active vibration reduction device of a machine tool according to an exemplary embodiment of the present disclosure includes a processing unit 341 and a feedback unit 342.

The processing unit 341 performs a function of transmitting a current signal to the excitation unit so that the excitation unit generates excitation having a vibration intensity and a vibration direction opposite to the vibration data of the individual device in accordance with the sensing result by the sensing unit, the analysis result by the analysis unit, the calculation result by the calculation unit, and the data stored in the data storage unit, thereby controlling the excitation unit to generate compensation excitation with an opposite phase to the vibration data of the individual device.

The feedback unit 342 performs a function of receiving feedback of a current vibration state of the individual device by receiving feedback of sensing information received by the sensing unit and information about excitation generated by the excitation unit after the excitation unit generates excitation.

Therefore, in the active vibration reduction device of a machine tool according to an exemplary embodiment of the present disclosure, the vibration occurring in the individual device is reduced automatically and actively through the control unit and excitation unit in accordance with changes in magnitude and intensity of the vibration, and accordingly, it is possible to improve the convenience of an operator, reduce production and maintenance costs and time, and increase exports.

As shown in FIGS. 3 to 8, the excitation unit 100 of the active vibration reduction device of a machine tool according to an exemplary embodiment of the present disclosure includes a housing unit 110, a fixed unit 120, a vibration unit 130, a guide unit 140, an actuator unit 150, and a damper unit 160.

The housing unit 110 forms an external shape of the excitation unit and provides a space where the fixed unit, the actuator unit, the vibration unit, and the guide unit are installed. In addition, preferably, the housing unit 110 includes a plate-shaped base part 111 coupled to the individual device and a support part 112 extending to protrude from both sides of the base part in perpendicular directions and supporting the fixed unit and the guide unit. That is, the base part is formed in a roughly quadrangular plate shape, and the support part extends to protrude from both sides of the base part so as to face each other in perpendicular directions, thereby providing a space where the fixed unit and the guide unit are coupled and fixedly installed to the housing unit.

The fixed unit 120 is fixedly installed to the housing unit and selectively forms an electromagnetic field. In addition, preferably, the fixed unit 120 includes a stator core 121 both sides of which are fixedly coupled to the support part, and a stator 122 on which a coil is wound while surrounding an outer peripheral surface of the stator core. That is, the stator core is formed in a quadrangular rod or circular rod shape having a predetermined length in a horizontal direction, and a coil is wound around the stator core by a certain number of times, so that current flows through the coil of the stator in accordance with a current value signal transmitted through the processing unit of the reduction unit and an electromagnetic field is thus formed.

The vibration unit 130 is slidably coupled to the guide unit in order to generate excitation when a specific electromagnetic field is formed by a current value applied through the actuator unit.

In addition, preferably, the vibration unit 130 includes a slide part 131 configured to have a predetermined weight while accommodating therein the fixed unit composed of the stator core and the stator, and a permanent magnet 132 fixedly installed on an inner surface of the slide part to be spaced apart from the stator by a predetermined distance. The slide part may be formed in a substantially rectangular parallelepiped or cubic shape with a hollow cavity.

The actuator unit 150 transmits the current applied to the fixed unit under control of the control unit. That is, the actuator unit 150 is arranged at a part of the base part or support part, and performs a function of transmitting the current applied to the fixed unit according to the signal transmitted through the processing unit, thereby causing the current to flow through the coil wound around the stator to form an electromagnetic field. Additionally, the actuator unit includes and may include a vibration sensor. Such a vibration sensor may be formed as an acceleration sensor or the like.

The guide unit 140 is installed in a part of the housing unit. In addition, preferably, the guide unit 140 includes a rail part 141 both sides of which are coupled to the support part so as to be parallel to the stator core, and a block part 142 formed on an outer surface of the slide part so as to guide movement of the slide part and sliding along the rail part.

The damper unit 160 is arranged between the housing unit and the vibration unit to suppress vibration occurring during the sliding movement of the slide part and prevent damage to the slide part and the like.

In this way, in the active vibration reduction device of a machine tool according to an exemplary embodiment of the present disclosure, the fixed unit and vibration unit of the excitation unit are implemented in a sliding manner using the electromagnet so that excitation having a magnitude and direction opposite to the vibration data of the individual device sensed by the sensing unit is accurately and promptly generated in the excitation unit to actively reduce in real time vibrations generated from the individual device, and accordingly, it is possible to reduce production and maintenance costs through miniaturization of the excitation unit, maximize space utilization, and make the machine tool compact.

In addition, the excitation unit of the active vibration reduction device of a machine tool may be arranged in plural on one individual device and may generate excitation with multiple degrees of freedom under control of the control unit. That is, as shown in FIG. 8, in the active vibration reduction device of a machine tool according to another exemplary embodiment of the present disclosure, an excitation unit 100' includes a first excitation part 101 and a second excitation part 102 arranged to be orthogonal to each other, and the first excitation part generates excitation in the Y-axis direction opposite to the vibration in the Y-axis direction of the individual device, and the second excitation part generates excitation in the Z-axis direction opposite to the vibration in the Z-axis direction of the individual device. Accordingly, the excitation generated by the excitation unit is also generated to have two degrees of freedom with respect to the vibration of two degrees of freedom of the individual device, so that excitation with multiple degrees of freedom is generated actively, promptly and automatically with respect to the vibration with multiple degrees of freedom of the individual device, thereby actively reducing the vibration.

An active vibration reduction method of a machine tool according to an exemplary embodiment of the present disclosure will be described with reference to FIG. 10. The active vibration reduction method of a machine tool according to an exemplary embodiment of the present disclosure includes a data storage step (S1), a sensing step (S2), a confirmation step (S3), a comparison step (S4), a speed calculation step (S5), an excitation value calculation step (S6), a current value calculation step (S7), a determination step (S8), a processing step (S9), and a feedback step (S10). The overall operating principle, control method, equipment configuration, and the like of the active vibration reduction method of a machine tool according to an exemplary embodiment of the present disclosure are the same as those of the active vibration reduction device of a machine tool according to an exemplary embodiment of the present disclosure, and descriptions will be given, focusing on differences.

Data for automatically reducing vibrations generated from each of the individual devices constituting the machine tool, from which vibrations are generated during an operation of the machine tool, in real time by actively changing and generating excitation opposite to vibration data of each individual device in real time in an excitation unit is stored.

After the data storage step (S1), vibrations of the individual device are sensed by a sensing unit installed adjacent to a vibration generation part of the individual device where the excitation unit is installed.

After the sensing step (S2), it is confirmed by the confirmation unit whether vibration has occurred in the individual device.

After the confirmation step (S3), a sensing value and a pre-stored reference value are compared by the comparison unit when it is confirmed that vibration has occurred in the individual device.

After the comparison step (S4), a speed of the individual device is calculated by a speed calculation unit in accordance with a sensing result, a confirmation result, a comparison result, and pre-stored data when the sensing value exceeds the reference value as a result of the comparison.

After the speed calculation step (S5), an excitation value to be generated by the excitation unit is calculated by an excitation calculation unit in accordance with the sensing result, the confirmation result, the comparison result, the speed calculation result, and the pre-stored data.

After the excitation value calculation step (S6), a current value to be transmitted to the excitation unit is calculated by a current calculation unit in accordance with the sensing result, the confirmation result, the comparison result, the excitation value calculation result, and the pre-stored data.

After the current value calculation step (S7), a direction of excitation to be generated by the excitation unit is determined in accordance with the sensing result, the confirmation result, the comparison result, the current value calculation result, and the pre-stored data.

After the determination step (S8), the excitation unit is caused to generate excitation by transmitting a current signal to the excitation unit so that the excitation unit generates excitation having a vibration intensity and a vibration direction opposite to vibration data of the individual device in accordance with the sensing result, the confirmation result, the comparison result, the current value calculation result, the determination result, and the pre-stored data.

After the processing step (S9) of generating excitation, information about generation generated from the excitation unit is fed back.

In this way, in the active vibration reduction method of a machine tool according to an exemplary embodiment of the present disclosure, the current and direction transmitted to the excitation unit are conveniently and promptly adjusted to automatically control promptly and accurately the vibration intensity and vibration direction of excitation generated in the excitation unit. Accordingly, it is possible to improve machining productivity by minimizing non-processing time associated with analysis, maintenance and the like for vibration reduction in accordance with the dynamic characteristics that change in real time in the individual device.

An operating principle of the active vibration reduction device and method of a machine tool according to an exemplary embodiment of the present disclosure will be described with reference to FIGS. 3 to 15.

When vibration of the individual device is sensed by the sensing unit mounted on the individual device from which vibration is generated during an operation of the machine tool, a sensing value is transmitted to the control unit in accordance with an acceleration signal.

Then, the confirmation unit confirms whether vibration has occurred, and when it is confirmed that vibration has occurred, the comparison unit compares the sensing value with the reference value.

Then, when the sensing value exceeds the reference value as a result of the comparison, the speed calculation unit calculates a speed by integrating the vibration signal according to the acceleration signal, and the excitation calculation unit again calculates an excitation value by multiplying the speed by the gain.

Then, the current calculation unit calculates a current value through Mathematical Equation 1 in accordance with the excitation value calculated by the excitation calculation unit. When the current value is calculated by the current calculation unit, the determination unit determines an excitation generation direction by determining a vibration direction and the like of the individual device.

Then, when the processing unit transmits a signal to the actuator unit in accordance with the current value calculated by the current calculation unit and the excitation generation direction determined by the determination unit, the actuator unit transmits the current to the stator with the current value calculated by the signal transmitted to the actuator unit in accordance with the input and output directions of the current, thereby forming an electromagnetic field.

Then, as the permanent magnet of the vibration unit forms an electromagnetic field in conjunction with the electromagnetic field formed in the stator, the slide part slides reciprocally in the direction determined by the determination unit through the block part and along the rail part, so that excitation having an intensity and direction opposite to the vibration generated from the individual device is generated to cancel out the vibration of the individual device, thereby reducing the vibration of the individual device.

Then, feedback information about the excitation generated from the slide part is transmitted to the feedback unit of the reduction unit, the confirmation unit continuously checks the information from the feedback unit and the information sensed in real time from the sensing unit to confirm the presence or absence of vibration, and the intensity and direction of the excitation are actively changed and generated so as to continuously correspond to the intensity and direction of the vibration generated from the individual device, thereby suppressing the vibration of the individual device.

Figure 12:
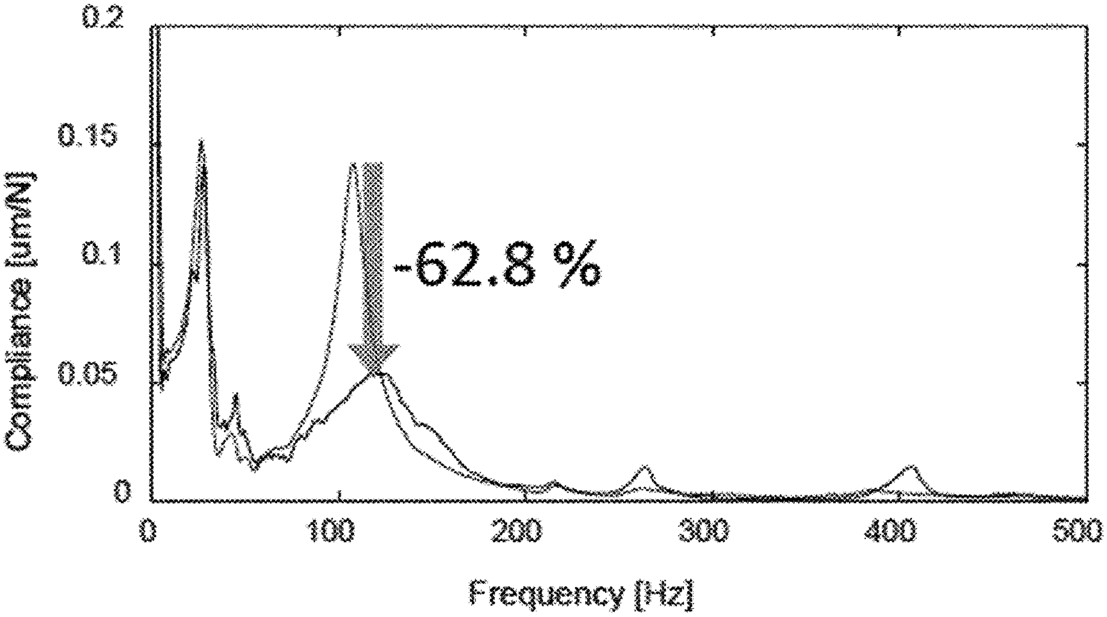

FIG. 12 shows a case where the active vibration reduction device of a machine tool according to an exemplary embodiment of the present disclosure was operated (black solid line) and was not operated (blue solid line) in a state in which the Z-axis position is 0, and it can be seen that the vibration was reduced by 62.8% (see the arrow) in the spindle, which is an individual device, when the active vibration reduction device of a machine tool according to an exemplary embodiment of the present disclosure was operated.

Figure 13:
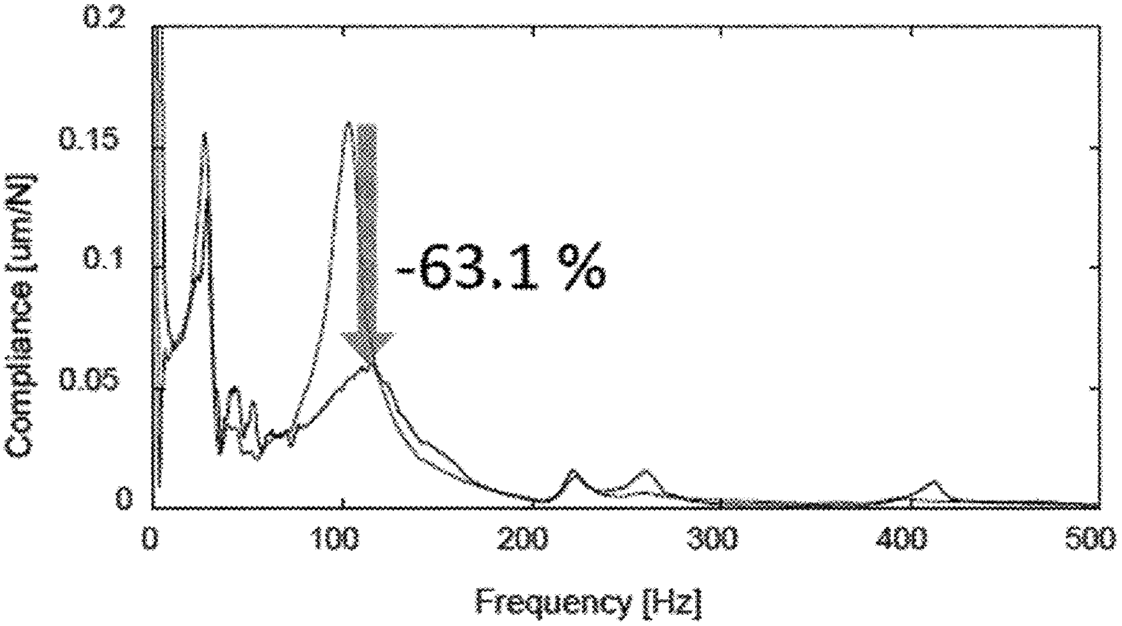

Likewise, FIG. 13 shows a case where the active vibration reduction device of a machine tool according to an exemplary embodiment of the present disclosure was operated (black solid line) and was not operated (blue solid line) in a state in which the Z-axis position is 100, and it can be seen that the vibration was reduced by 63.1% (see the arrow) in the spindle, which is an individual device, when the active vibration reduction device of a machine tool according to an exemplary embodiment of the present disclosure was operated.

Figure 14:
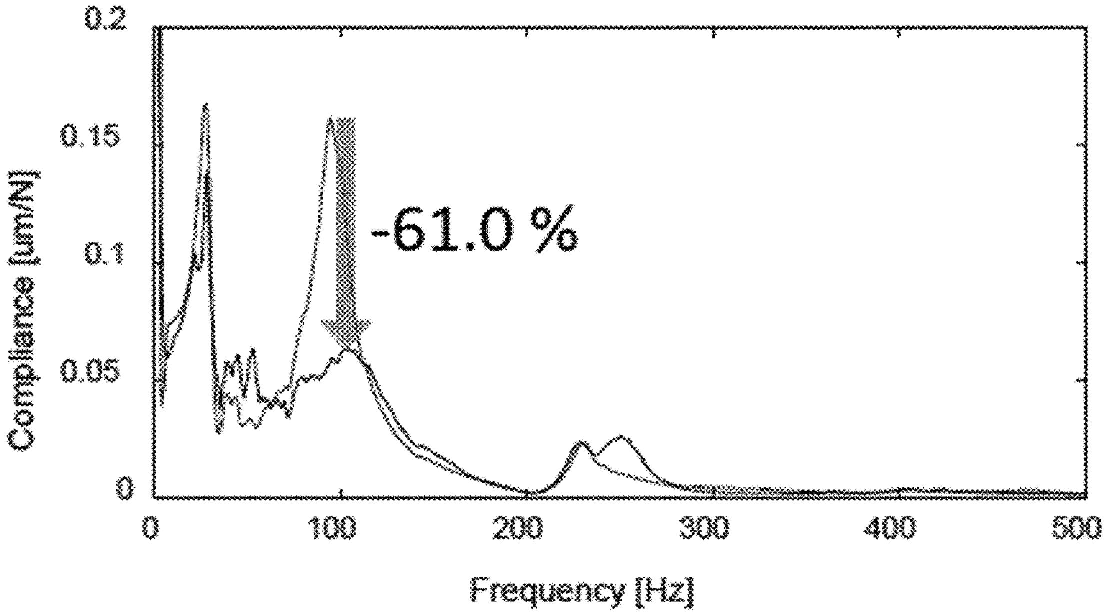

In addition, FIG. 14 shows a case where the active vibration reduction device of a machine tool according to an exemplary embodiment of the present disclosure was operated (black solid line) and was not operated (blue solid line) in a state in which the Z-axis position is 200, and it can be seen that the vibration was reduced by 61.0% (see the arrow) in the spindle, which is an individual device, when the active vibration reduction device of a machine tool according to an exemplary embodiment of the present disclosure was operated.

Figure 15:
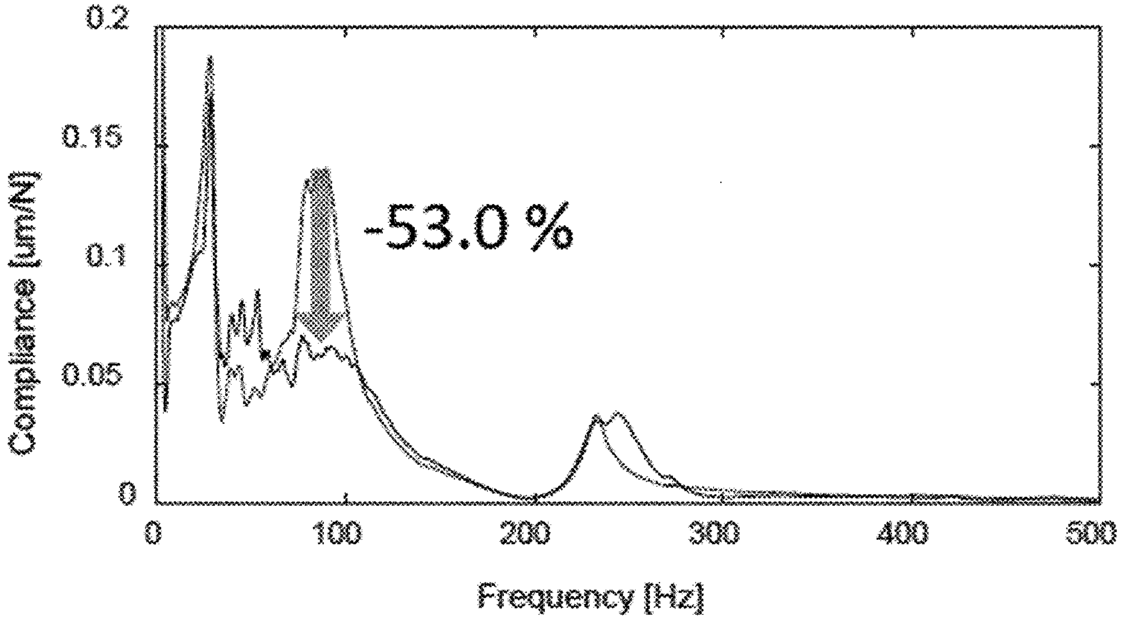

Moreover, FIG. 15 shows a case where the active vibration reduction device of a machine tool according to an exemplary embodiment of the present disclosure was operated (black solid line) and was not operated (blue solid line) in a state in which the Z-axis position is 300, and it can be seen that the vibration was reduced by 53.0% (see the arrow) in the spindle, which is an individual device, when the active vibration reduction device of a machine tool according to an exemplary embodiment of the present disclosure was operated.

Figure 11:
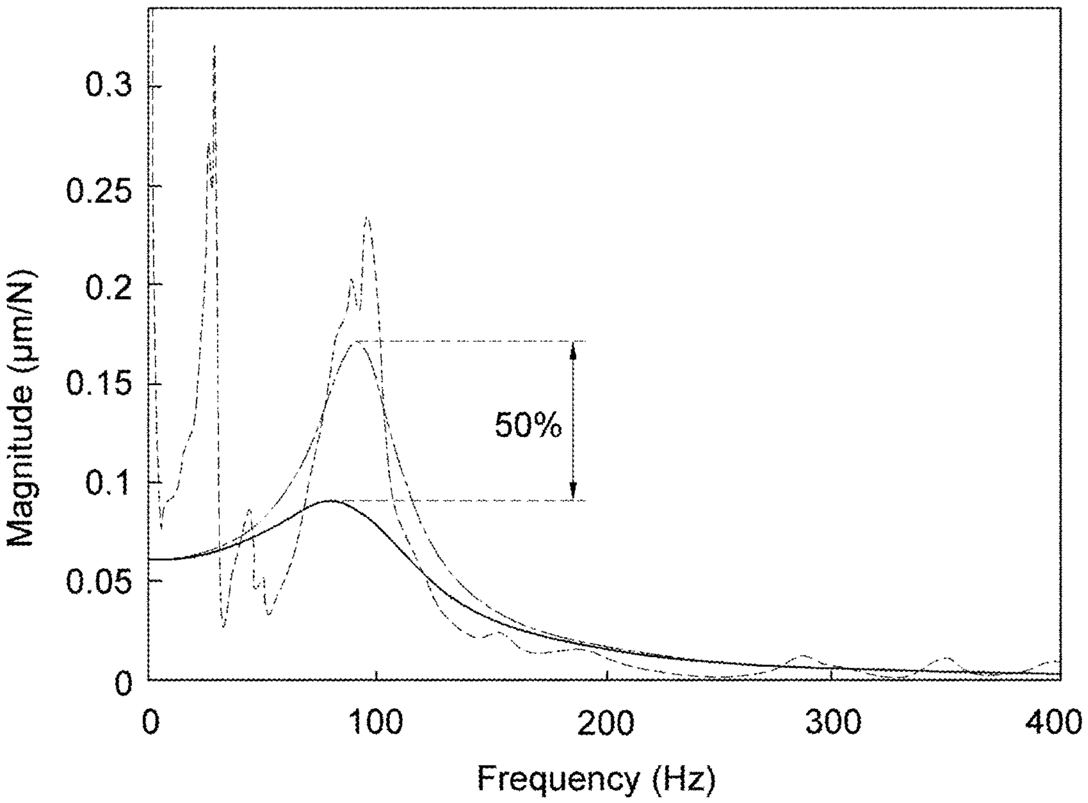
FIGS. 11 to 15 show graphs showing a state in which vibration is reduced by the active vibration reduction device and method of a machine tool according to an exemplary embodiment of the present disclosure.

That is, as shown in FIG. 11, when the active vibration reduction device and method of a machine tool according to an exemplary embodiment of the present disclosure are operated, the vibration of the individual device is reduced by 50% or more on average, thereby improving machining accuracy and improving stability and reliability of the machine tool, which can be seen from the graphs of FIGS. 11 to 15.

Therefore, in the active vibration reduction device and method of a machine tool according to an exemplary embodiment of the present disclosure, vibrations generated from the individual unit are automatically and actively reduced in real time by changing an intensity of excitation and a direction of excitation in real time in the excitation unit so as to comply with an actual machining state of the individual device or a change in dynamic characteristics caused by a change in position of the individual device, the excitation being opposite to vibration data of the individual device sensed by the sensing unit installed adjacent to the vibration generation part of the individual device where the excitation unit is arranged, and accordingly, it is possible to maximize machining accuracy of the machine tool and improve safety and reliability of the machine tool. In addition, the fixed unit and vibration unit of the excitation unit are implemented in a sliding manner using the electromagnet, and accordingly, it is possible to reduce production and maintenance costs through miniaturization of the excitation unit, maximize space utilization, and make the machine tool compact.

While the present disclosure has been described above with reference to the exemplary embodiments of the present disclosure in the detailed description of the present disclosure, it may be understood, by those skilled in the art or those of ordinary skill in the art, that the present disclosure may be variously modified and changed without departing from the spirit and scope of the present disclosure disclosed in the claims. Accordingly, the technical scope of the present disclosure should not be limited to the contents disclosed in the detailed description of the specification but should be defined only by the claims.

[Description of Main Reference Numerals of Drawings]

| | |
|---|---|
| 1: active vibration reduction device | 100: excitation unit |
| 110: housing unit | 120: fixed unit |
| 130: vibration unit | 140: guide unit |
| 150: actuator unit | 200: sensing unit |
| 300: control unit | 310: data storage unit |
| 20: analysis unit | 330: calculation unit |
| 340: reduction unit | |

The invention claimed is:

1. An active vibration reduction device of a machine tool, comprising:

an excitation unit arranged on each of individual devices constituting the machine tool, from which vibrations are generated during an operation of the machine tool, and configured to generate excitation;

a sensing unit installed adjacent to a vibration generation part of the individual device where the excitation unit is arranged, and configured to sense vibration of the individual device; and a control unit configured to control an operation of the excitation unit, wherein the control unit is configured to automatically reduce in real time vibrations generated from the individual device by actively changing excitation generated by the excitation unit so that excitation opposite to vibration data of the individual device is generated in real time in accordance with the vibration data of the individual device sensed by the sensing unit, wherein the control unit comprises:

a data storage unit for storing data for automatically and actively reducing the vibration of the individual device by causing the excitation unit to generate the excitation opposite to the vibration data of the individual device in accordance with the vibration data of the individual device sensed by the sensing unit;

analysis circuitry configured to analyze vibration information on the individual device by analyzing the vibration data sensed by the sensing unit and the data stored in the data storage unit;

calculation circuitry configured to calculate an intensity and a direction of the excitation generated by the excitation unit through an analysis result by the analysis circuitry and the data stored in the data storage unit; and reduction circuitry configured to automatically reduce the vibration of the individual device by actively changing and generating excitation opposite to that of the individual device in real time in the excitation unit in accordance with a calculation result by the calculation circuitry, wherein the data storage unit comprises:

a basic data storage unit for storing data for the individual device of the machine tool, a machining program, and data for a drive program;

a reference data storage unit for storing data on a reference value for confirming an occurrence of vibration for each individual device and a gain value for each individual device;

a sensing data storage unit for storing data sensed by the sensing unit; and a real-time data storage unit for storing the analysis result by the analysis circuitry, the calculation result by the calculation circuitry, and a reduction result by the reduction circuitry in real time, wherein the analysis circuitry comprises:

confirmation circuitry configured to confirm whether vibration occurs in each individual device when the machine tool operates, through the data sensed by the sensing unit and the data stored in the data storage unit; and comparison circuitry configured to compare a real-time vibration sensing value of the individual device stored in the sensing data storage unit with the reference value stored in the reference data s rage unit when it is confirmed that vibration has occurred as a confirmation result by the confirmation circuitry;

wherein the calculation circuitry comprises:

speed calculation circuitry configured to calculate a speed of the individual device in accordance with the analysis result by the analysis circuitry and the data stored in the data storage unit when it is determined that the sensing value exceeds the reference value as a comparison result by the comparison circuitry;

excitation calculation circuitry configured to calculate an excitation value to be generated by the excitation unit in accordance with the analysis result by the analysis circuitry, a calculation result by the speed calculation circuitry, and the data stored in the data storage unit;

current calculation circuitry configured to calculate a current value to be transmitted to the excitation unit in accordance with the analysis result by the analysis circuitry, a calculation result by the excitation calculation circuitry, and the data stored in the data storage unit; and determination circuitry configured to determine a direction of excitation to be generated by the excitation unit in accordance with the sensing result by the sensing unit, the analysis result by the analysis circuitry, a calculation result by the current calculation circuitry, and the data stored in the data storage unit, wherein the reduction circuitry comprises:

a processor configured to transmit a current signal to the excitation unit so that the excitation unit generates excitation having a vibration intensity and a vibration direction opposite to the vibration data of the individual device in accordance with the sensing result by the sensing unit, the analysis result by the analysis circuitry, the calculation result by the calculation circuitry, and the data stored in the data storage unit; and feedback circuitry configured to receive feedback of sensing information received by the sensing unit and information about excitation generated by the excitation unit after the excitation unit generates excitation.

2. The active vibration reduction device of a machine tool of claim 1, wherein the excitation unit comprises:

a housing unit;

a fixed unit fixedly installed on the housing unit and configured to selectively form an electromagnetic field;

an actuator unit configured to transmit a current applied to the fixed unit under control of the control unit;

a guide unit installed on a part of the housing unit; and a vibration unit slidably coupled to the guide unit in order to generate excitation when a specific electromagnetic field is formed by a current value applied through the actuator unit.

3. The active vibration reduction device of a machine tool of claim 2, wherein the excitation unit comprises a damper unit arranged between the housing unit and the vibration unit.

4. The active vibration reduction device of a machine tool of claim 3, wherein the housing unit comprises:

a base part coupled to the individual device; and a support part extending from both sides of the base part to support the fixed unit and the guide unit.

5. The active vibration reduction device of a machine tool of claim 4, wherein the fixed unit comprises:

a stator core both sides of which are fixedly coupled to the support part; and a stator on which a coil is wound while surrounding an outer peripheral surface of the stator core.

6. The active vibration reduction device of a machine tool of claim 5, wherein the vibration unit comprises:

a slide part configured to have a predetermined weight while accommodating the fixed unit therein; and a permanent magnet fixedly installed on an inner surface of the slide part to be spaced apart from the stator by a predetermined distance.

7. The active vibration reduction device of a machine tool of claim 6, wherein the guide unit comprises:

a rail part both sides of which are coupled to the support part so as to be parallel to the stator core; and a block part formed on an outer surface of the slide part so as to guide movement of the slide part and configured to slide along the rail part.

8. The active vibration reduction device of a machine tool of claim 1, wherein the excitation unit is arranged in plural on one individual device and is configured to generate excitation with multiple degrees of freedom under control of the control unit.

9. An active vibration reduction method of a machine tool, comprising:

storing data for automatically reducing vibrations generated from each of individual devices constituting the machine tool, from which vibrations are generated during an operation of the machine tool, in real time by actively changing and generating excitation opposite to vibration data of each individual device in real time in an excitation unit;

sensing vibrations of the individual device by a sensing unit installed adjacent to a vibration generation part of the individual device where the excitation unit is installed;

confirming whether vibration has occurred in the individual device;

comparing a sensing value with a pre-stored reference value when it is confirmed that vibration has occurred in the individual device;

calculating a speed of the individual device in accordance with a sensing result, a confirmation result, a comparison result, and pre-stored data when the sensing value exceeds the reference value as a result of the comparison;

calculating an excitation value to be generated by the excitation unit in accordance with the sensing result, the confirmation result, the comparison result, the speed calculation result, and the pre-stored data;

calculating a current value to be transmitted to the excitation unit in accordance with the sensing result, the confirmation result, the comparison result, the excitation value calculation result, and the pre-stored data;

determining a direction of excitation to be generated by the excitation unit in accordance with the sensing result, the confirmation result, the comparison result, the current value calculation result, and the pre-stored data; and causing the excitation unit to generate excitation by transmitting a current signal to the excitation unit so that the excitation unit generates excitation having a vibration intensity and a vibration direction opposite to vibration data of the individual device in accordance with the sensing result, the confirmation result, the comparison result, the current value calculation result, the determination result, and the pre-stored data.

* * * * *